(12) United States Patent
Lei et al.

(10) Patent No.: US 10,388,460 B2
(45) Date of Patent: Aug. 20, 2019

(54) LOW INDUCTANCE CAPACITOR

(71) Applicant: FORD GLOBAL TECHNOLOGIES, LLC, Dearborn, MI (US)

(72) Inventors: Guangyin Lei, Dearborn Heights, MI (US); Xi Lu, Northville, MI (US); Zhuxian Xu, Novi, MI (US); Chingchi Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 15/161,668

(22) Filed: May 23, 2016

(65) Prior Publication Data

US 2017/0338041 A1 Nov. 23, 2017

(51) Int. Cl.
*H01G 4/32* (2006.01)
*H01G 4/33* (2006.01)
*H01G 4/005* (2006.01)
*H01G 4/228* (2006.01)
*B60L 3/00* (2019.01)
*H01G 4/252* (2006.01)

(52) U.S. Cl.
CPC ............... *H01G 4/32* (2013.01); *B60L 3/003* (2013.01); *B60L 3/0046* (2013.01); *H01G 4/228* (2013.01); *H01G 4/252* (2013.01); *Y02T 10/7022* (2013.01); *Y10S 903/907* (2013.01)

(58) Field of Classification Search
CPC ............ H01G 4/32; H01G 4/33; H01G 4/005; H01G 4/228
USPC ........ 361/306.3, 301.5, 306.1, 816, 511, 530
See application file for complete search history.

(56) References Cited

U.S. PATENT DOCUMENTS

| | | | |
|---|---|---|---|
| 4,264,943 A | 4/1981 | Anderson et al. | |
| 4,633,368 A | 12/1986 | Frederick | |
| 6,845,551 B2 | 1/2005 | Mandelcorn et al. | |
| 7,891,087 B2 | 2/2011 | Yang et al. | |
| 2006/0104006 A1* | 5/2006 | Saito ........................ | H01G 2/04 361/301.3 |
| 2009/0154056 A1 | 6/2009 | Delgado et al. | |

\* cited by examiner

*Primary Examiner* — Jenny L Wagner
*Assistant Examiner* — Arun Ramaswamy
(74) *Attorney, Agent, or Firm* — David Kelley; Brooks Kushman P.C.

(57) ABSTRACT

A capacitor comprising first and second end sprays respectively located at distal ends of a capacitor cell, a positive polarity bus bar extending from a first wound conductive layer of the capacitor cell adjacent to the first end spray, a negative polarity bus bar extending from a second wound conductive layer of the capacitor cell adjacent to the second end spray, and a capacitor film wrapped around an area between the first and second conductive layers.

18 Claims, 4 Drawing Sheets

LOW INDUCTANCE CAPACITOR

TECHNICAL FIELD

The present disclosure relates to a capacitor that may be utilized with electrical components to reduce inductance of the capacitor.

BACKGROUND

Electric and hybrid electric vehicles may use high voltage sources (e.g. battery packs or fuel cells) that deliver direct current (DC) to drive motors, electrical traction systems, and other vehicle systems. Such systems may utilize power inverters to convert the DC input from the power source to alternating current (AC) output compatible with electric motors and other electrical components. Such inverters may include both capacitor modules and power modules interconnected by a capacitor system that distributes current throughout the inverter. A typical inverter may incur voltage spikes when currents flowing through the power module abruptly change, such as when the inverter is switched off. The magnitudes of these voltage spikes are related to the inductance of the capacitor.

Voltage spikes are intensified for systems that have a high inherent inductance. That is, even relatively small changes in current can produce relatively large voltage spikes if the inductance is high. A capacitor may contribute substantially to the total inductance of an inverter system because of the relatively long current pathway between its various input and output nodes. A low inductance capacitor may reduce voltage spikes when power modules are switched off. The capacitor may provide for distributing current within a power inverter that has fewer parts and minimizes material costs.

SUMMARY

A first illustrative embodiment a capacitor comprising a body including a conductive layer wound around a spiral capacitor film, first and second end sprays respectively located at opposite ends of the body, a first bus bar attached to and extending from the first end spray; and a second bus bar attached to and extending from the conductive layer at a location between the first bus bar and the second end spray.

A second illustrative embodiment a capacitor comprising a first bus bar extending from a first end spray and a second bus bar, having a polarity opposite the first bus bar, extending from a conductive layer that is wrapped around a capacitor film and an insulation layer of a body of the capacitor, wherein the conductive layer is disposed between the capacitor film and second end spray.

A third illustrative embodiment discloses a capacitor comprising first and second end sprays respectively located at distal ends of a capacitor cell, a positive polarity bus bar extending from a first wound conductive layer of the capacitor cell adjacent to the first end spray, a negative polarity bus bar extending from a second wound conductive layer of the capacitor cell adjacent to the second end spray, and a capacitor film wrapped around an area between the first and second conductive layers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
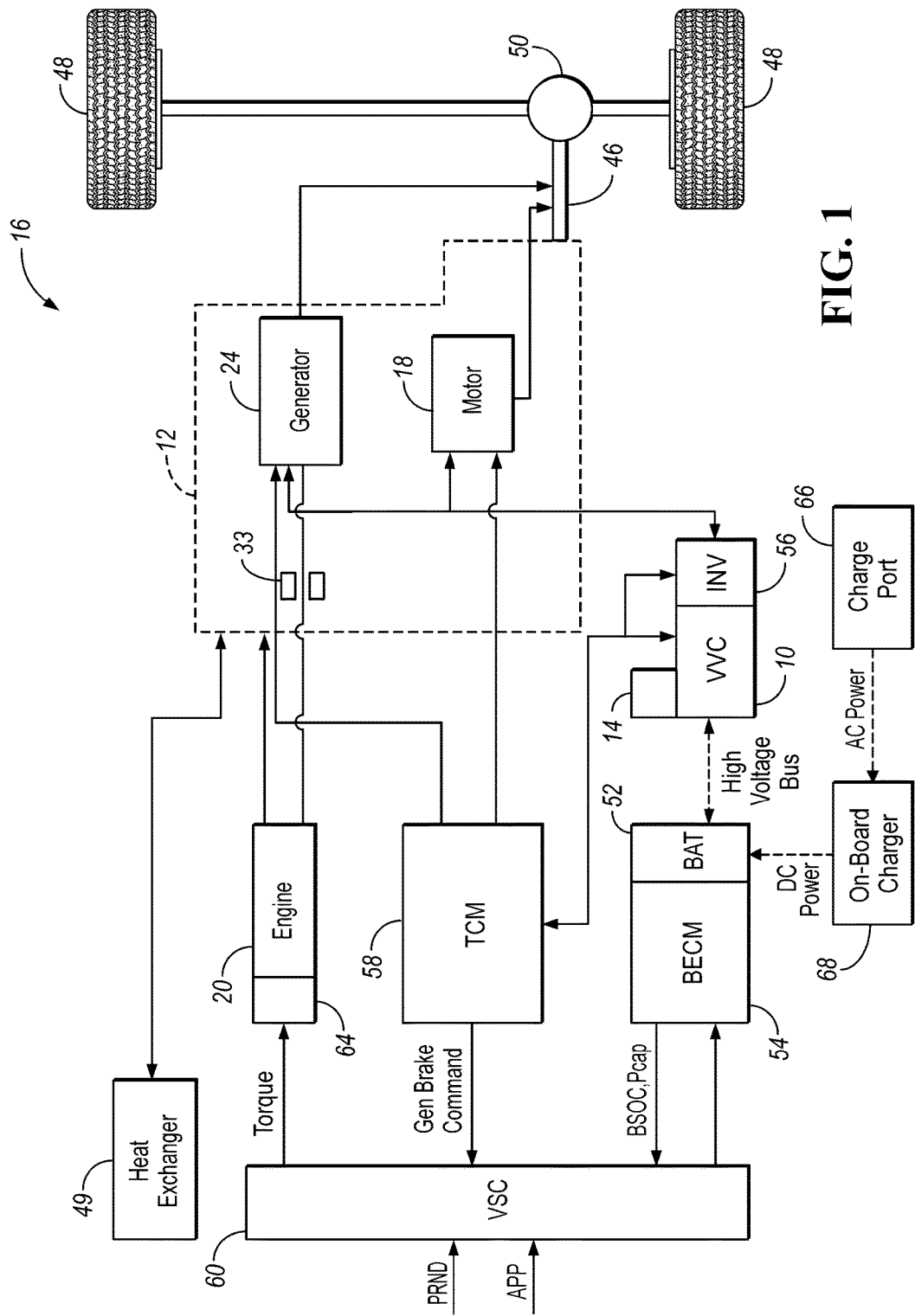
FIG. 1 is a schematic diagram of an example of an electrified vehicle.

An example of a PHEV is depicted in FIG. 1, referred to generally as a vehicle 16 herein. The vehicle 16 may include a transmission 12 and is an example of an electric vehicle propelled by an electric machine 18 with assistance from an internal combustion engine 20. The vehicle 16 may be connectable to an external power grid. The electric machine 18 may be an AC electric motor depicted as a motor 18 in FIG. 1. The electric machine 18 receives electrical power and provides torque for vehicle propulsion. The electric machine 18 may also function as a generator for converting mechanical power into electrical power through regenerative braking.

The transmission 12 may be a power-split configuration. The transmission 12 may include the first electric machine 18 and a second electric machine 24. The second electric machine 24 may be an AC electric motor depicted as a generator 24 in FIG. 1. Similar to the first electric machine 18, the second electric machine 24 may receive electrical power and provide output torque. The second electric machine 24 may also operate as a generator for converting mechanical power into electrical power and optimizing power flow through the transmission 12. In other embodiments, the transmission may not have a power-split configuration.

The transmission 12 may include a planetary gear unit (not shown) and may operate as a continuously variable transmission and without any fixed or step ratios. The transmission 12 may also include a one-way clutch (O.W.C.) and a generator brake 33. The O.W.C. may be coupled to an output shaft of the engine 20 to control a direction of rotation of the output shaft. The O.W.C. may prevent the transmission 12 from back-driving the engine 20. The generator brake 33 may be coupled to an output shaft of the second electric machine 24. The generator brake 33 may be activated to "brake" or prevent rotation of the output shaft of the second electric machine 24 and of the sun gear 28. Alternatively, the O.W.C. and the generator brake 33 may be replaced by implementing control strategies for the engine 20 and the second electric machine 24. The transmission 12 may be connected to a driveshaft 46. The driveshaft 46 may be coupled to a pair of drive wheels 48 through a differential 50. An output gear (not shown) of the transmission may assist in transferring torque between the transmission 12 and the drive wheels 48. The transmission 12 may also be in communication with a heat exchanger 49 or an automatic transmission fluid cooler (not shown) for cooling the transmission fluid.

The vehicle 16 includes an energy storage device, such as a traction battery 52 for storing electrical energy. The battery 52 may be a HV battery capable of outputting electrical power to operate the first electric machine 18 and the second electric machine 24 as further described below. The battery 52 may also receive electrical power from the first electric machine 18 and the second electric machine 24 when they are operating as generators. The battery 52 may be a battery pack made up of several battery modules (not shown), where each battery module contains a plurality of battery cells (not shown). Other embodiments of the vehicle 16 contemplate alternative types of energy storage devices, such as capacitors and fuel cells (not shown) that may supplement or replace the battery 52.

A high voltage bus may electrically connect the battery 52 to the first electric machine 18 and to the second electric machine 24. For example, the vehicle 16 may include a battery energy control module (BECM) 54 for controlling the battery 52. The BECM 54 may receive input indicative of certain vehicle conditions and battery conditions, such as battery temperature, voltage, and current. The BECM 54 may calculate and estimate parameters of the battery 52, such as a battery state of charge (BSOC) and a battery power capability (Pcap). The BECM 54 may provide output that is indicative of the BSOC and Pcap to other vehicle systems and controllers.

The vehicle 16 may include a DC-DC converter or variable voltage converter (VVC) 10 and an inverter 56. The VVC 10 and the inverter 56 may be electrically connected between the battery 52 and the first electric machine 18 and the second electric machine 24. The VVC 10 may "boost" or increase a voltage potential of electrical power provided by the battery 52. The VVC 10 may also "buck" or decrease voltage potential of the electrical power provided to the battery 52. The inverter 56 may invert DC power supplied by the battery 52 via the VVC 10 to AC power for operating each of the electric machines 18 and 24. The inverter 56 may also rectify AC power provided by each of the electric machines 18 and 24 to DC for charging the battery 52. In other examples, the transmission 12 may operate with multiple inverters, such as one invertor associated with each of the electric machine 18 and 24. The VVC 10 includes an inductor assembly 14 (further described in relation to FIG. 2).

The transmission 12 is shown in communication with a transmission control module (TCM) 58 for controlling the electric machines 18 and 24, the VVC 10, and the inverter 56. The TCM 58 may be configured to monitor conditions of each of the electric machines 18 and 24 such as position, speed, and power consumption. The TCM 58 may also monitor electrical parameters (e.g., voltage and current) at various locations within the VVC 10 and the inverter 56. The TCM 58 provides output signals corresponding to this information for other vehicle systems to utilize.

The vehicle 16 may include a vehicle system controller (VSC) 60 that communicates with other vehicle systems and controllers for coordinating operations thereof. Although shown as a single controller, it is contemplated that the VSC 60 may include multiple controllers to control multiple vehicle systems and components according to an overall vehicle control logic or software.

The vehicle controllers, such as the VSC 60 and the TCM 58, may include various configurations of microprocessors, ASICs, ICs, memory (e.g., FLASH, ROM, RAM, EPROM and/or EEPROM), and software code to cooperate with one another to perform vehicle operations. The controllers may also include predetermined data, or "look up tables," which are accessible from the memory and may be based on calculations and test data. This predetermined data may be utilized by the controllers to facilitate control of the vehicle operations. The VSC 60 may communicate with other vehicle systems and controllers (e.g., the BECM 54 and the TCM 58) over one or more wired or wireless connections using bus protocols such as CAN and LIN. The VSC 60 may receive input (PRND) that represents a current position of the transmission 12 (e.g., park, reverse, neutral or drive). The VSC 60 may also receive input (APP) that represents an accelerator pedal position. The VSC 60 may provide outputs representative of a desired wheel torque, desired engine speed, and a generator brake command to the TCM 58; and contactor control to the BECM 54.

The vehicle 16 may include an engine control module (ECM) 64 for controlling the engine 20. The VSC 60 provides output, such as desired engine torque, to the ECM 64 that may be based on a number of input signals including APP and may correspond to a driver's request for vehicle propulsion.

The battery 52 may periodically receive AC energy from an external power supply or grid via a charge port 66. The vehicle 16 may also include an on-board charger 68 which receives the AC energy from the charge port 66. The charger 68 may include AC/DC conversion capability to convert the received AC energy into DC energy suitable for charging the battery 52 during a recharge operation. Although illustrated and described in the context of a PHEV, it is contemplated that the inverter 56 may be implemented with other types of electrified vehicles, such as a FHEV or a BEV.

Figure 2:
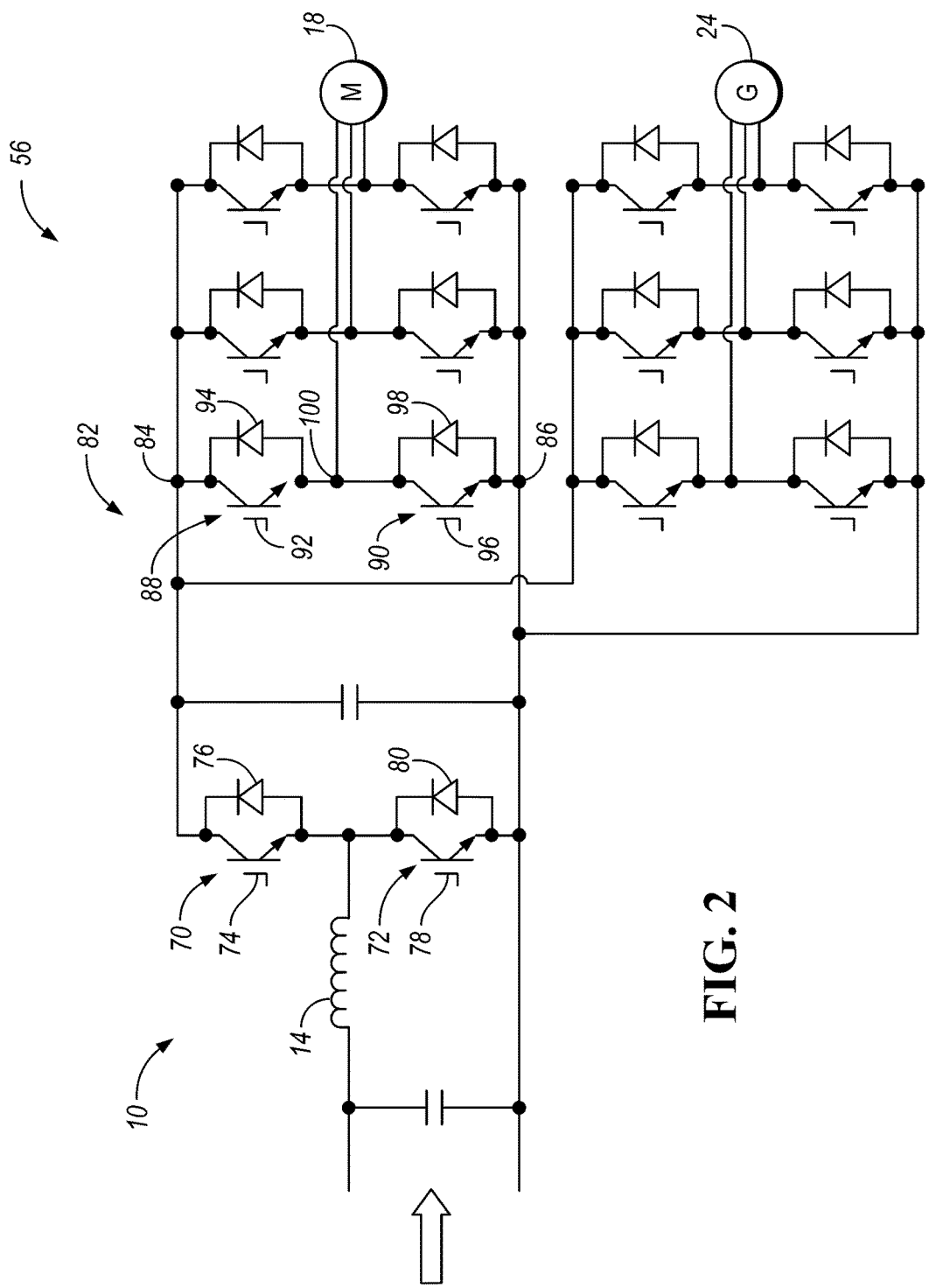
FIG. 2 is a schematic diagram of a variable voltage converter and power inverter.

Referring to FIG. 2, an example of an electrical schematic of the VVC 10 and the inverter 56 is shown. The VVC 10 may include a first switching unit 70 and a second switching unit 72 for boosting the input voltage (V_bat) to provide output voltage (V_dc). The first switching unit 70 is shown with a first transistor 74 connected in parallel to a first diode 76 and with their polarities switched (referred to as anti-parallel herein). The second switching unit 72 is shown with a second transistor 78 connected anti-parallel to a second diode 80. Each of the transistors 74 and 78 may be a type of controllable switch (e.g., an insulated gate bipolar transistor (IGBT) or field-effect transistor (FET)). Additionally, each of the transistors 74 and 78 may be individually controlled by the TCM 58. The inductor assembly 14 is depicted as an input inductor that is connected in series between the battery 52 and the switching units 70 and 72. The inductor assembly 14 may generate magnetic flux when a current is supplied. When the current flowing through the inductor assembly 14 changes, a time-varying magnetic field is created and a voltage is induced. Other embodiments of the VVC 10 may include alternative circuit configurations (e.g., more than two switches).

The inverter 56 may include a plurality of half-bridges 82 stacked in an assembly. Each of the half-bridges 82 may be packaged as a power stage. In the illustrated example, the inverter 56 includes six half-bridges (though FIG. 2 labels only one complete half-bridge 82), three for the motor 18 and three for the generator 24. Each of the half bridges 82 may include a positive DC lead 84 that is coupled to a positive DC node from the battery 52 and a negative DC lead 86 that is coupled to a negative DC node from the battery 52. Each of the half bridges 82 may also include a first switching unit 88 and a second switching unit 90. The first switching unit 88 includes a first transistor 92 connected in parallel to a first diode 94. The second switching unit 90 includes a second transistor 96 connected in parallel to a second diode 98. The first transistor 92 and the second transistors 96 may be IGBTs or FETs. The first switching unit 88 and the second switching unit 90 of each of the half-bridges 82 converts the DC power of the battery 52 into a single phase AC output at the AC lead 100. Each of the AC leads 100 is electrically connected to the motor 18 or generator 24. In this example, three of the AC leads 100 are electrically connected to the motor 18 and the other three AC leads 100 are electrically connected to the generator 24.

A film capacitor is a component that is used for electrified vehicle applications. Capacitors with low self-inductance may be used to reduce the over-design of semiconductor devices and save the component cost. Conductive material, such as metallized film, aluminum or copper foil, etc., is wound together with the insulation layer to provide shielding of the inner part. By adding the conductive layers outside the metallized film, the self-inductance of the capacitor cell can be effectively lowered.

Figure 3:
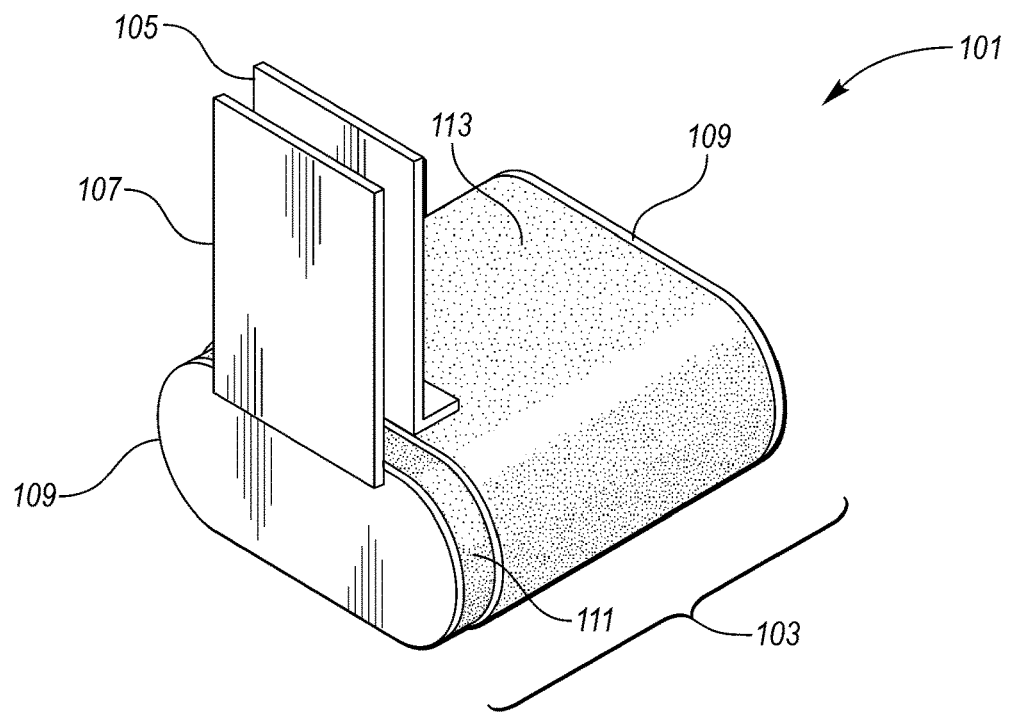
FIG. 3 illustrates a perspective view of a capacitor.

FIG. 3 illustrates a sectional view of a capacitor. The capacitor 101 may be used in automotive applications or any other type of electrical applications. In the automotive environment, a capacitor 101 may be a component used in traction inverter used in an electrical vehicle (EV) or hybrid vehicle. The capacitor may be used in the traction inverter to absorb the ripple current and smooth voltage in a direct current (DC) link or bus bar. The capacitor 101 includes a capacitor cell 103 that may be used to store energy. The capacitor cell 103 may also include a plurality of bus bars attached to it. The bus bars are utilized to pass current between an inverter, and other electrical components (e.g. converter, etc.), and a capacitor cell 103. The bus bars may be attached to a conductive layer of the capacitor cell. The bus bars themselves may be neutral, however, when used in an electrical application, the bus bars may then have a defined polarity dependent on the electrical component the capacitor 101 is connected to. For example, the capacitor cell may include both a negative polarity bus bar 105 and a positive polarity bus bar 107. Each capacitor may include multiple bus bars that have varying length and width. For example, the positive polarity bus bar 107 may include a wider dimension or may be lengthier than the negative polarity bus bar 105, and vice versa. Each of the bus bars may be separated by a defined distance between one another. The bus bars may extend generally parallel to one another in generally core extensive planes, although it is not required. For example, the bus bars may extend outwards along opposite sides of the capacitor 101. While the bus bars may be both located at each of the end sprays, it is not required. For example, the bus bars may be attached to conductive layers that are adjacent to each end spray, but the bus bars themselves may not be directly attached to the end sprays. Additionally, the self-inductance may increase as the distance between the two bus bars increases and they are further away from each other. In some applications, it may be beneficial to minimize the self-inductance between the bus bars, thus minimizing the distance between the two bus bars could accomplish lowering the self-inductance.

In one embodiment, the positive polarity bus bar 107 may be attached to the end spray 109 of the capacitor. An electrical connection to a metallized film may be made with a layer of molten metal droplets sprayed on each end of the capacitor, with lead wires welded to each end spray 109. The connection of the metallized film to the end spray 109 may not be continuous, as small metal particles may contact the metallized layer at discrete locations. The bus bars may be used to pass current inside of electronic devices. The bus bar may be used as a lead to the electronic component.

Between the positive polarity bus bar 107 and the negative polarity bus bar 105 may be a capacitor film 111, which may be a wound metallized film that is wrapped around the body of the capacitor or the capacitor cell 103. The capacitor cell 103 or body of the capacitor may also be covered with a conductive layer 113. The conductive layer 113 may be multiple layers of conductive material, such as metallized film, aluminum foil, copper foil, etc. The conductive material may be wound together with the insulation layer outside of the capacitor film 111 to provide shielding of an inner part of the capacitor 101 that includes a wound metallized film layer. By adding the conductive layers 113 outside the wound metallized film, the self-inductance of the capacitor cell can be effectively lowered, without introducing or minimizing additional manufacturing processing. As an example, the self-inductance of the capacitor 101 may be lower than 1 nanoHenry (nH).

Figure 4:
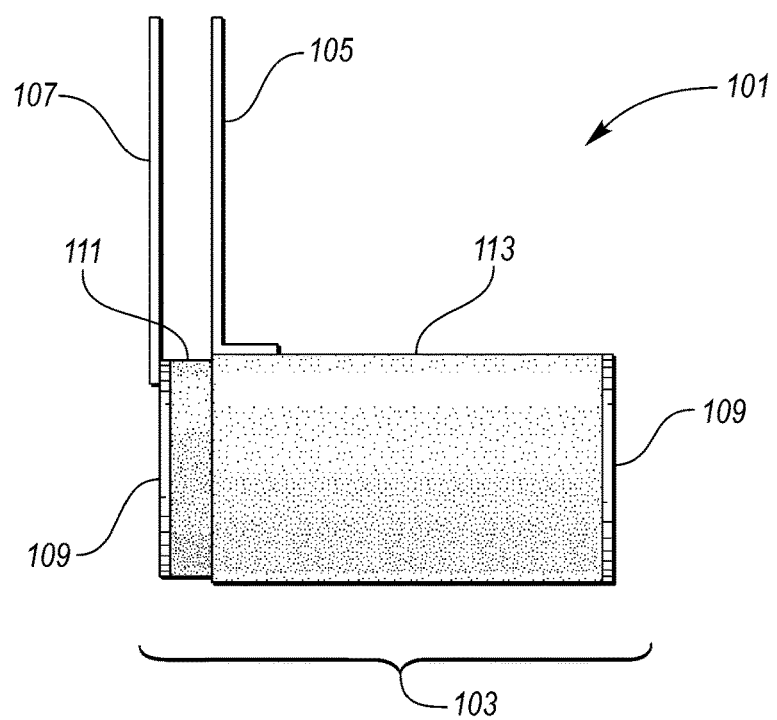
FIG. 4 illustrates a side view of a capacitator.

FIG. 4 illustrates a side view of a capacitor 101. In one illustrative embodiment, the capacitor 101 may include a positive polarity bus bar 107 attached to one end spray, and a negative polarity bus bar 105 attached to a conductive layer 113. The negative polarity bus bar 105 may be attached to any part of the conductive layer 113 along the capacitor cell 103. However, the negative polarity bus bar 105 that is at the opposite end spray 109 than that of the positive polarity bus bar 107 may allow for increased self-inductance due to the distance between each bus bar. For example, the negative polarity bus bar 105 may touch any surface of the conductive layer 113 and not necessarily the portion of the conductive layer 113 that is closest to the positive polarity bus bar 107. Furthermore, each of the bus bars is not required to be on the same side of the capacitor cell 103. Instead, the bus bars may be located on opposite surfaces. For example, the positive polarity bus bar 107 may be on the top surface of the capacitor cell 103, while the negative polarity bus bar 105 may be on the bottom surface of the capacitor cell 103.

Figure 5:
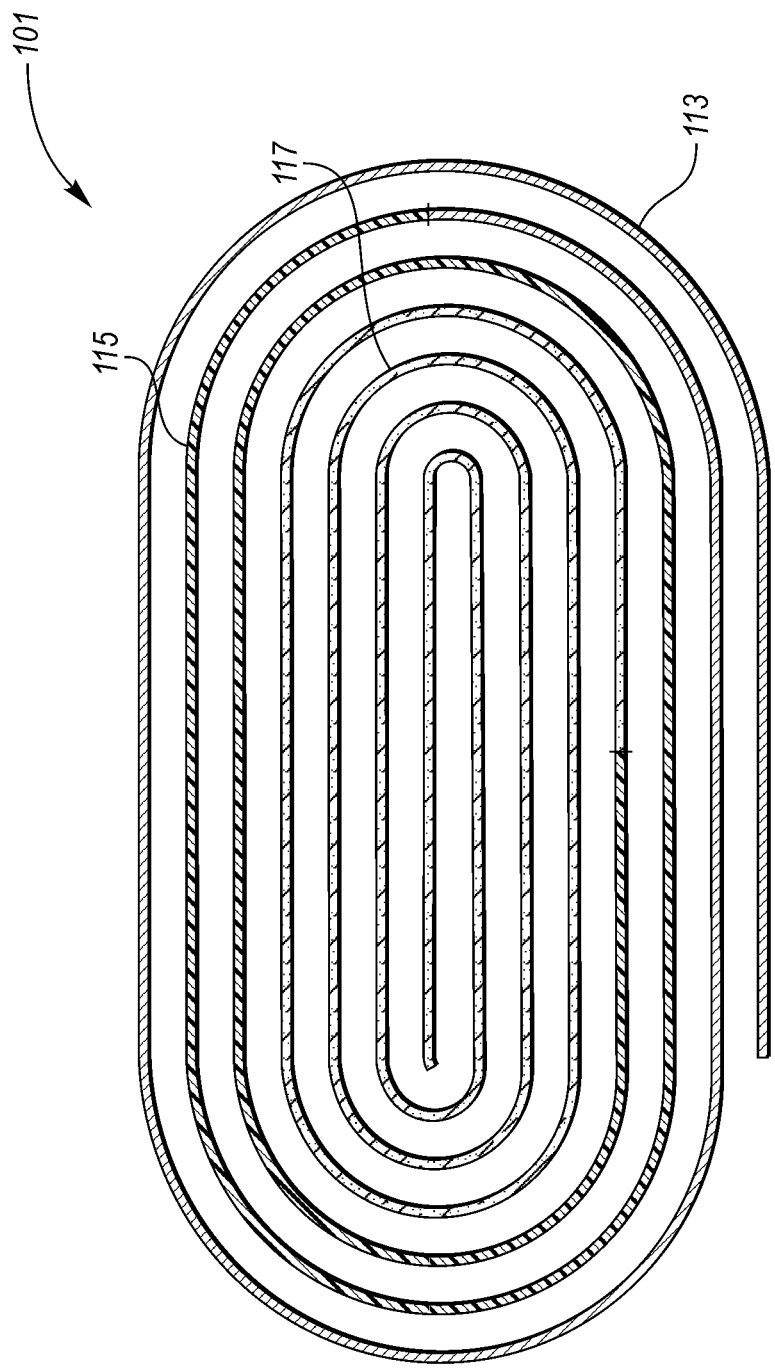
FIG. 5 illustrates a front cross-sectional of a capacitor.

FIG. 5 illustrates a front cross-sectional of a capacitor that includes a conductive layer. The capacitor may be first wrapped with a wound metallized film 117 that is a polymer that includes a metallization layer. There may be multiple layers of the wound metallized film that are made up of the core of the capacitor in one embodiment. The wound metallization film is a functional portion to form the film capacitor. The capacitor may require a non-conductive dielectric layer and two conductive layers on both sides of the dielectric. The property of the dielectric layer may determine the performance of the capacitor, as well as the capacitance value. For a film capacitor, the capacitor may utilize a thin polymer film with a double-sided metallization layer, such as a wound metallized film.

Next, the capacitor's layer of wound metallized film 117 may be wrapped in a blank film 115 for insulation. The blank film 115 may include materials similar to those as the wound metallized film, however, it should not be metallized or conductive. Thus, the blank film may be a thin polymer film. The blank film 115 or capacitor film 115 may be utilized to protect the inside functioning layers of the capacitor from electrical, mechanical, and/or chemical damage.

The conductive layer 113 may be wrapped around the blank film 115, which may be also referred to as an insulation layer. The conductive layer may be thick enough to conduct current, utilizing metals to pass current. The thickness may need to meet a specific current level of 50-60 amperes. In another embodiment, the conductive layer 113 may also be wrapped with another insulation layer or blank film layer.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A capacitor comprising:
   a body including a conductive layer wound around a spiral capacitor film;
   first and second end sprays respectively located at opposite ends of the body;
   a first bus bar configured to pass current to an electric device connected to the capacitor, and attached to and extending from the first end spray; and
   a second bus bar configured to pass current to the device, and attached to and extending from the conductive layer at a location between the first bus bar and the second end spray.

2. The capacitor of claim 1, wherein the conductive layer is disposed between the capacitor film and the second end spray.

3. The capacitor of claim 1, wherein the capacitor film is disposed between the first bus bar and the conductive layer.

4. The capacitor of claim 1, wherein the first bus bar and the second bus bar extend from a same side of the body.

5. The capacitor of claim 1, wherein the first bus bar extends from a side of the body opposite the second bus bar.

6. The capacitor of claim 1, wherein the conductive layer includes a metalized film.

7. The capacitor of claim 1, wherein a distance between the first and second bus bars is less than a distance between the second bus bar and the second end spray.

8. The capacitor of claim 1, wherein a distance between the first and second bus bars is greater than a distance between the second bus bar and the second end spray.

9. The capacitor of claim 1 further comprising a spiral metallized film, wherein the spiral capacitor film is wound around the spiral metallized film.

10. The capacitor of claim 9 further comprising an insulation layer wound around the conductive layer.

11. The capacitator of claim 1, wherein a self-inductance of the capacitor is less than 1 nanohenry (nH).

12. The capacitor of claim 1, wherein the first and second bus bars are of opposite polarity.

13. A capacitor comprising:
    a first bus bar extending from a first end spray and configured to pass current; and
    a second bus bar, having a polarity opposite the first bus bar, configured to pass current and extending from a conductive layer that is wrapped around a capacitor film and an insulation layer of a body of the capacitor, wherein the conductive layer is disposed between the capacitor film and second end spray.

14. The capacitor of claim 13, wherein the capacitor film is disposed between the first and second bus bars.

15. A capacitor comprising:
    first and second end sprays respectively located at distal ends of a capacitor cell;
    a positive polarity bus bar extending from a first wound conductive layer of the capacitor cell adjacent to the first end spray;
    a negative polarity bus bar extending from a second wound conductive layer of the capacitor cell adjacent to the second end spray; and
    a capacitor film wrapped around an area between the first and second conductive layers.

16. The capacitor of claim 15, wherein the bus bars extend away from opposite surfaces of the capacitor cell.

17. The capacitor of claim 15 further comprising an insulation layer wrapped around at least one of the first and second conductive layers.

18. The capacitor of claim 15, wherein a self-inductance of the capacitor is less than 1 nanohenry (nH).

* * * * *